(12) United States Patent
Lee

(10) Patent No.: US 7,946,944 B2
(45) Date of Patent: May 24, 2011

(54) ELECTRIC CONTINUOUSLY VARIABLE TRANSMISSION AND THE DRIVING METHOD THEREOF

(75) Inventor: Chan Jae Lee, Seoul (KR)

(73) Assignee: Poongsung Construction Co., Ltd., Chungcheongbuk-Do (KR)

( * ) Notice: Subject to any disclaimer, the term of this patent is extended or adjusted under 35 U.S.C. 154(b) by 721 days.

(21) Appl. No.: 11/995,248

(22) PCT Filed: Jul. 13, 2005

(86) PCT No.: PCT/KR2005/002256
§ 371 (c)(1),
(2), (4) Date: Jan. 10, 2008

(87) PCT Pub. No.: WO2007/007925
PCT Pub. Date: Jan. 18, 2007

(65) Prior Publication Data
US 2008/0207376 A1    Aug. 28, 2008

(51) Int. Cl.
*F16H 48/06* (2006.01)
(52) U.S. Cl. ........... 475/156; 475/149
(58) Field of Classification Search .......... 475/149, 475/150, 156, 157
See application file for complete search history.

(56) References Cited

U.S. PATENT DOCUMENTS

| | | | | |
|---|---|---|---|---|
| 2,385,630 A * | 9/1945 | Lear | ............... | 475/155 |
| 3,797,331 A * | 3/1974 | Kjeldsteen | ............ | 475/153 |
| 4,526,060 A * | 7/1985 | Watanabe | ............ | 475/4 |
| 5,080,639 A | 1/1992 | Sakakibara et al. | | |
| 6,363,807 B1 | 4/2002 | Takahashi et al. | | |
| 7,354,372 B2 * | 4/2008 | Wang | ............ | 475/155 |

FOREIGN PATENT DOCUMENTS

KR    10-2005-0077161    8/2005

* cited by examiner

*Primary Examiner* — Ha D. Ho
(74) *Attorney, Agent, or Firm* — IPLA P.A.; James E. Bame

(57) ABSTRACT

An electric continuously variable transmission comprises a first rotating plate (110) which is mounted to a first shaft and provided with a sun gear (112), a second rotating plate (120) to which a planetary gear unit (121) is mounted, and a third rotating plate (130) which is mounted to a second shaft, with a ring gear (132) provided on a circumferential inner surface of the third rotating plate. The transmission further includes a field unit (140) which has a first coil (114) wound around a plurality of cores (113) provided on the first rotating plate. The transmission further includes a generation coil unit (150) which has a second coil (124) wound around a plurality of cores (123) provided on the second rotating plate.

12 Claims, 4 Drawing Sheets

ELECTRIC CONTINUOUSLY VARIABLE TRANSMISSION AND THE DRIVING METHOD THEREOF

TECHNICAL FIELD

The present invention relates, in general, to electric continuously variable transmissions and methods of driving the same and, more particularly, to an electric continuously variable transmission in which a speed change operation is performed by adjusting of the size of a magnetic field and/or the size of an electric load, thus preventing friction and wear from occurring during the speed change process, and a method of driving the same.

BACKGROUND ART

A conventional continuously variable transmission is a kind of automatic transmission and comprises pulleys, which are mounted to an input shaft and an output shaft and are provided with respective side plates having variable widths, and a power transmission belt comprising a steel belt and metal blocks. When each side plate of the pulleys is tapered and each pulley is configured as a wide pulley such that the power transmission belt is moved towards the center of the axles of the pulleys, the continuously variable transmission accomplishes operational effects expected by reducing the diameters of gears and reducing the number of teeth of the gears. Thus, the transmission can execute the speed change operation by controlling the widths of the pulleys using hydraulic pressure. The power transmission belt is constructed by setting the metal blocks in the steel belt such that power is transmitted in one direction determined by leaning motion of the metal blocks in the same manner as domino pieces which sequentially fall down.

In the conventional continuously variable transmission, the widths of the pulleys are changed by hydraulic pressure. When the input pulley is wider than the output pulley, the transmission changes the speed to a low speed. However, when the input pulley is narrower than the output pulley, the transmission changes the speed to a high speed.

However, the conventional continuously variable transmission causes severe friction between the power transmission belt and the pulleys, thus reducing its speed changing efficiency and its expected life span. Furthermore, the conventional continuously variable transmission executes the speed change operation by adjusting the widths of the pulleys, thus precise control of the operation thereof is not easy.

DISCLOSURE

Technical Problem

Accordingly, the present invention has been made keeping in mind the above problems occurring in the prior art, and an object of the present invention is to provide an electric continuously variable transmission which prevents friction and wear from occurring during a speed changing operation, thus increasing its speed changing efficiency and its expected life span, and in which a speed change operation is performed by adjusting the size of a magnetic field and/or the resistance value of an electric load, thus making it possible for the operation to be precisely controlled.

Technical Solution

The present invention provides an electric continuously variable transmission, including a first rotating plate mounted to a first shaft and provided with a sun gear, a second rotating plate to which a planetary gear unit is mounted, and a third rotating plate mounted to a second shaft, with a ring gear provided on a circumferential inner surface of the third rotating plate. The transmission further includes a field unit, having a first coil wound around a plurality of cores provided on a surface of the first rotating plate, wherein winding directions of the first coil around adjacent cores alternate, and the first coil is electrically connected to a power supply. The transmission further includes a generation coil unit, having a second coil wound around a plurality of cores provided on a surface of the second rotating plate, wherein winding directions of the second coil around adjacent cores alternate, and the second coil is electrically connected to an electric load. The present invention conducts a speed change operation by adjusting the size of a magnetic field and/or the resistance value of an electric load, thus preventing friction and wear from occurring during a speed changing operation, thereby increasing the speed changing efficiency, increasing its expected life span, and making it possible for the operation to be precisely controlled.

Advantageous Effects

As described above, in an electric continuously variable transmission and a method of driving the same according to the present invention, a speed change operation is conducted by adjusting of the size of a magnetic field and/or the resistance value of an electric load, thus preventing friction and wear from occurring during a speed changing operation, thereby increasing the speed changing efficiency and its expected life span, and making it possible for the operation to be precisely controlled.

BEST MODE

Figure 1:
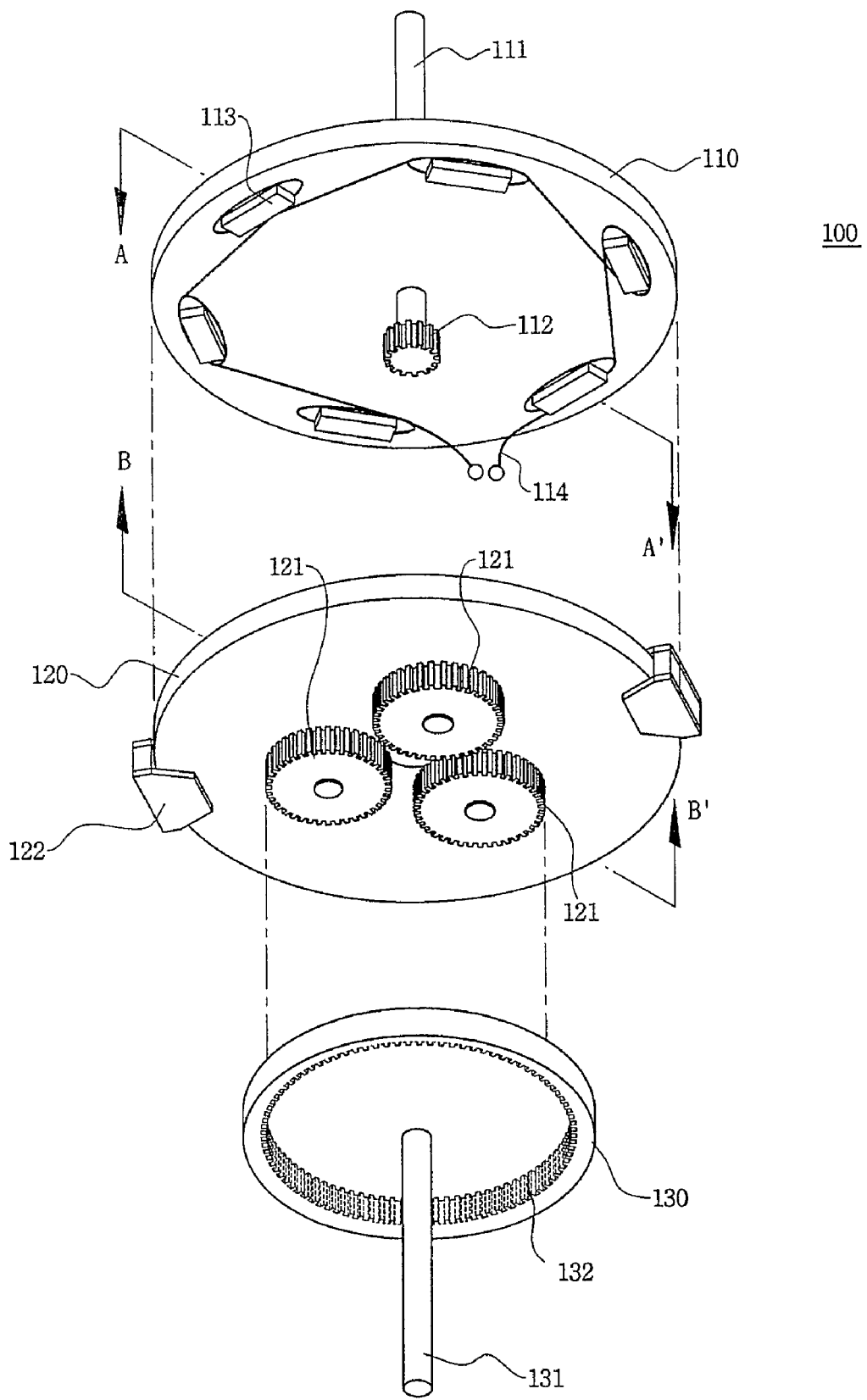
FIG. 1 is an exploded perspective view of an electric continuously variable transmission, according to a first embodiment of the present invention.

In order to accomplish the above object, an electric continuously variable transmission according to a first embodiment of the present invention includes: a first rotating plate mounted to a first shaft and provided with a sun gear; a second rotating plate to which a planetary gear unit is mounted; and a third rotating plate mounted to a second shaft, with a ring gear provided on a circumferential inner surface of the third rotating plate. The transmission further includes a field unit, having a first coil wound around a plurality of cores provided on a surface of the first rotating plate. Directions of winding the first coil around adjacent cores alternate, and the first coil is electrically connected to a power supply. The transmission further includes a generation coil unit, having a second coil wound around a plurality of cores provided on a surface of the second rotating plate. Directions of winding the second coil around adjacent cores alternate, and the second coil is electrically connected to an electric load.

Furthermore, the electric load may be an electromotor, a rotating shaft of which is coupled to the second shaft.

Preferably, the electric continuously variable transmission may further include an electric clutch directly connecting the first rotating plate and the second rotating plate to each other.

As well, the second rotating plate may be provided with an electric brake.

Meanwhile, a method of driving the electric continuously variable transmission according to the first embodiment of the present invention includes the steps of: (a) driving the first shaft using a motor; (b) adjusting a size of a magnetic field generated in the field unit by adjusting power of the power supply, so that both a rotational speed of the second rotating plate and a rotational speed of the second shaft are adjusted by the adjustment of the size of the magnetic field; and (c) fastening the first rotating plate and the second rotating plate to each other using the electric clutch, and turning the power supply off.

The driving method may further include the step of: (d) rotating the third rotating plate in a direction opposite to rotation of the first rotating plate by stopping the second rotating plate using the electric brake.

In order to accomplish the above object, an electric continuously variable transmission according to a second embodiment of the present invention includes: a first rotating plate mounted to a first shaft and provided with a sun gear; a second rotating plate to which a planetary gear unit is mounted, with a first ring gear provided around a circumferential outer surface of the second rotating plate; a third rotating plate mounted to a second shaft, with a ring gear provided on a circumferential inner surface of the third rotating plate; a control gear, a central shaft of which is coupled to a rotor of a generator, the control gear engaging with the first ring gear; and an electric load electrically connected to a coil of the generator.

Furthermore, the electric continuously variable transmission may further include an electric clutch directly connecting the first rotating plate and the second rotating plate to each other.

Preferably, the second rotating plate may be provided with an electric brake.

Meanwhile, a method of driving the electric continuously variable transmission according to the second embodiment of the present invention includes the steps of: (a) driving the first shaft using a motor; (b) adjusting a size of a magnetic field of the rotor, so that both a rotational speed of the second rotating plate and a rotational speed of the second shaft are adjusted; (c) fastening the first rotating plate and the second rotating plate to each other using the electric clutch; and (d) stopping the second rotating plate using the electric brake, and removing the magnetic field of the rotor.

In order to accomplish the above object, an electric continuously variable transmission according to a third embodiment of the present invention includes: a drive pinion mounted to a drive shaft; a ring gear engaging with the drive pinion; an arm fastened to the ring gear; a differential pinion provided in the arm; a first gear engaging with the differential pinion and coupled to an output shaft; and a second gear engaging with the differential pinion and coupled to a first end of a control shaft. A second end of the control shaft is fastened to a rotor of a motor-operated generator, and a coil of the motor-operated generator is electrically connected to an electric load.

Furthermore, the electric load may be an electromotor, a rotating shaft of which is coupled to the output shaft.

Preferably, the control shaft may be provided with an electric brake.

Meanwhile, a method of driving the electric continuously variable transmission according to the third embodiment of the present invention includes the steps of: (a) driving the drive shaft using a motor; (b) adjusting a size of a magnetic field of the rotor, so that both a rotational speed of the control shaft and a rotational speed of the output shaft are adjusted; and (c) stopping the rotation of the control shaft using the electric brake, and removing the magnetic field of the rotor.

Hereinafter, preferred embodiments of the present invention will be described in detail with reference to the drawings.

First, an electric continuously variable transmission according to a first embodiment of the present invention will be described herein below.

Referring to FIG. 1, the electric continuously variable transmission 100 according to the first embodiment of the present invention includes a first rotating plate 110, a second rotating plate 120, a third rotating plate 130, a field unit 140 and a generation coil unit 150.

The first rotating plate 110 is fastened to a first shaft 111. A sun gear 112 is mounted to the first rotating plate 110. A planetary gear unit 121 is mounted to the second rotating plate 120. The third rotating plate 130 is fastened to a second shaft 131. A ring gear 132 is provided on a circumferential inner surface of the third rotating plate 130.

The sun gear 112 rotatably engages with the planetary gear unit 121. The ring gear 132 also rotatably engages with the planetary gear unit 121.

Furthermore, the transmission 100 is provided with an electric clutch which directly connects the first rotating plate 110 and the second rotating plate 120 to each other. The second rotating plate 120 is provided with an electric brake 122.

Figure 2:
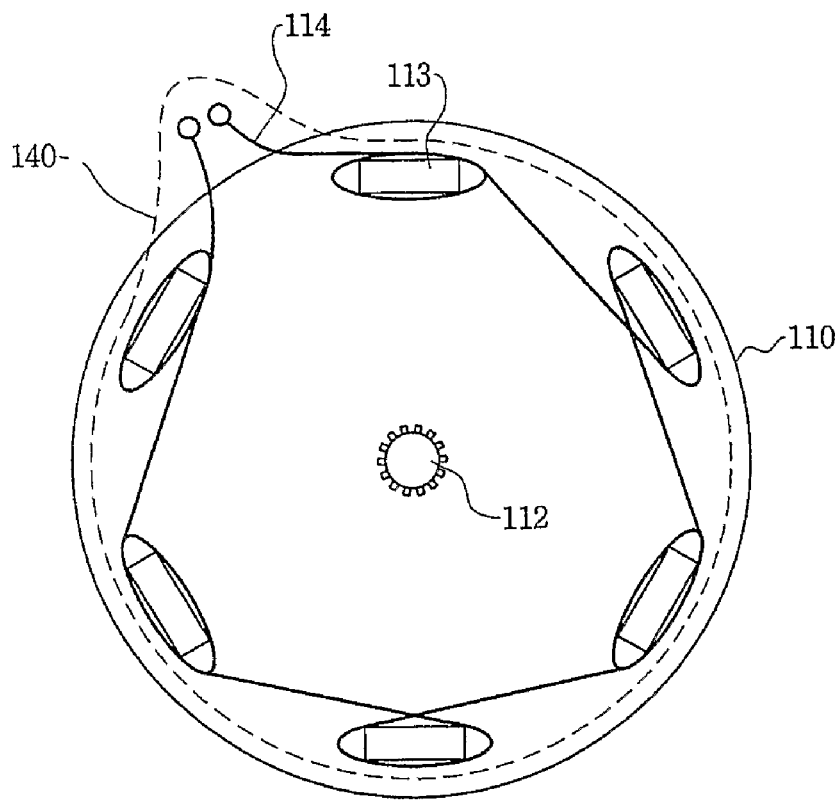
FIGS. 2 and 3 are sectional views respectively taken along the lines A-A' and B-B' of FIG. 1 showing the electric continuously variable transmission.
Figure 3:
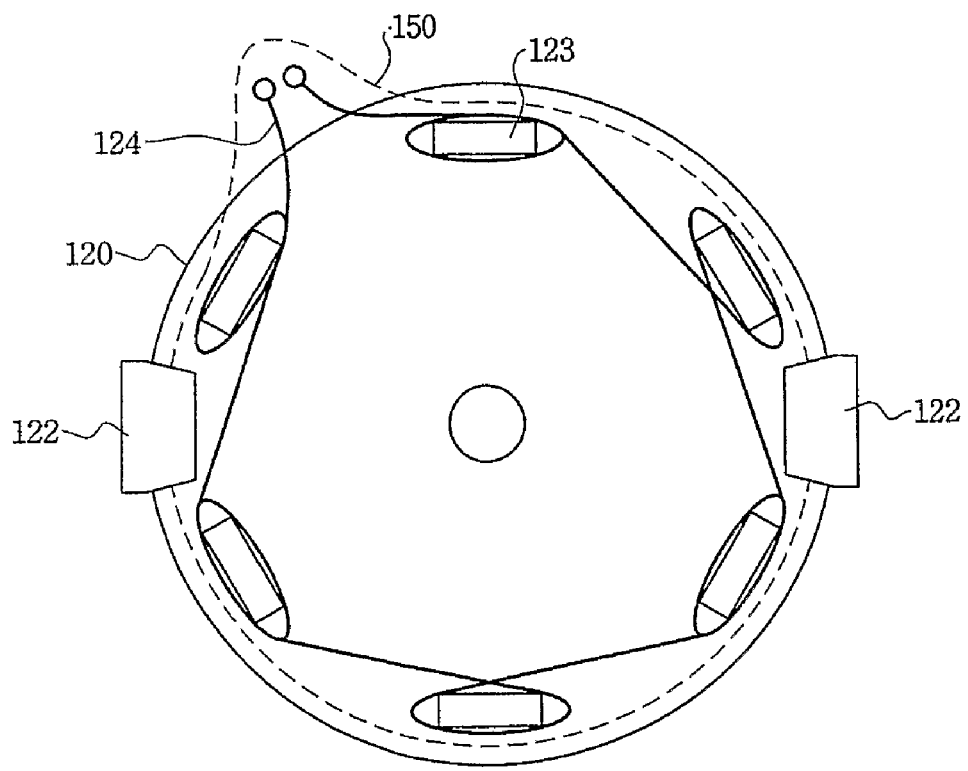

FIGS. 2 and 3 are sectional views respectively taken along the lines A-A' and B-B' of FIG. 1 showing the electric continuously variable transmission.

Referring to FIGS. 1 through 3, the field unit 140 includes a first coil 114 which is wound around a plurality of cores 113 that are provided on a surface of the first rotating plate 110. Here, winding directions of the first coil 114 around adjacent cores 113 alternate, and opposite ends of the first coil 114 are electrically connected to a power supply (not shown) through a commutator and a brush.

Therefore, when power is applied to the first coil 114, magnetic poles of magnetic fields formed by adjacent cores 113 become opposite to each other.

The generation coil unit 150 includes a second coil 124 which is wound around a plurality of cores 123 that are provided on a surface of the second rotating plate 120 facing the field unit 140. Here, directions of winding the second coil 124 around adjacent cores 123 alternate, and the second coil 124 is electrically connected to an electric load (not shown) through a commutator and a brush.

If the rotational speed of the first rotating plate 110, on which the field unit 140 is provided, differs from the rotational speed of the second rotating plate 120, on which the generation coil unit 150 is provided, induced voltage is generated in the second coil 124, which is wound around the cores 123 mounted to the second rotating plate 120, by the magnetic field formed by the cores 123 of the first rotating plate 110.

Furthermore, according to Lenz's law, torque is applied to the second coil 124 in the same direction as the rotation of the first rotating plate 110. As a result, torque is applied to the second rotating plate 120 in the same direction as the rotation of the first rotating plate 110.

Hereinafter, the operation and effect of the electric continuously variable transmission according to the first embodiment of the present invention will be explained.

In the case in which a magnetic field is not generated

What follows first is a description of rotational speeds of the first rotating plate 110, the second rotating plate 120 and the third rotating plate 130, when a magnetic field is not generated in the field unit 140.

While the power supply of the field unit 140 is turned off, no magnetic field is generated in the field unit 140.

As such, in the state in which no magnetic field is generated, when the first shaft 111 is rotated by a motor (not shown), the first rotating plate 110 and the sun gear 112 rotate at a rotating speed (linear speed) of V1 (a positive value means rotation in a clockwise direction).

Then, because the planetary gear unit 121 rotatably engages with the ring gear 132 of the third rotating plate 130 while engaging with the sun gear 112, each planetary gear rotates on its own axis at a speed of −V21 and revolves around the sun gear at a speed of V22. A rotational speed of the second rotating plate 120 becomes the same as the revolution speed of the planetary gear, that is, becomes V22. V22 cannot be greater than V1.

Furthermore, a rotational speed V3 of the third rotating plate 130 is the same as V22 subtracted by V21, that is, V3 equals V22−V21.

In the case in which the first rotating plate 110 and the second rotating plate 120 are stopped by the electric clutch, the rotational speed V22 of the second rotating plate 120 becomes V1, and the rotational speed of the planetary gear becomes zero. As a result, the rotational speed V3 of the third rotating plate 130 becomes V1.

When the second rotating plate 120 is stopped by the electric brake 122, the rotational speed V3 of the third rotating plate 130 becomes the rotational speed of the planetary gear, that is, becomes −V21.

The rotational speed of the second shaft 131 is the same as the rotational speed of the third rotating plate 130.

In other words, in the case in which no magnetic field is generated, the rotational speed of the second shaft 131 can be changed into three levels, that is, at a speed of V22−V21 when the second rotating plate 120 and the third rotating plate 130 rotate freely, at a speed of V1 when the electric clutch is operated, and at a speed of −V21 when the electric brake 122 is operated.

In the case in which a magnetic field is generated

Hereinafter, a description of rotational speeds of the first rotating plate 110, the second rotating plate 120 and the third rotating plate 130, when a magnetic field is generated, follows.

While the second rotating plate 120 and the third rotating plate 130 rotate freely without generating a magnetic field, the rotational speed of the first rotating plate 110 is V1, the rotational speed of the second rotating plate is V22, and the rotational speed of the third rotating plate 130 is V22−V21.

From this state, if the power supply of the field unit 140 is turned on, a magnetic field is generated in the cores 113.

At this time, because the rotational speeds of the first rotating plate 110 and the second rotating plate are respectively V1 and V22, that is, because they differ from each other, when the magnetic field is generated, induced voltage is applied to the second coil 124, and a torque due to the magnetic field is applied to the second coil 124 in the same direction as the rotation of the first rotating plate 110.

Therefore, because the torque generated by the magnetic field is applied to the second rotating plate 120 having the generation coil unit 150, the rotational speed V22 of the second rotating plate 120 increases until torques of the sun gear 112, the planetary gear unit 121 and the ring gear 132 are equilibrated.

If the size of the magnetic field is increased by increasing the power of the field unit 140, or if the resistance value of the electric load is reduced, a torque generated by the magnetic field is further increased, so that the rotational speed V22 is further increased.

If the torque generated by the magnetic field is further increased, the rotational speed V22 of the second rotating plate 120 is increased until it is the same as the rotational speed V1 of the first rotating plate 110. When V22 becomes the same as V1, the magnetic field does not generate any more torque. Accordingly, V22 cannot be greater than V1.

While V22 increases, power is generated in the generation coil unit 150 by an induced current flowing through the second coil 124. The generated power may be stored in an energy storage device.

For example, if an electromotor, a rotating shaft of which is coupled to the second shaft 124, is used as the electric load, which is electrically connected to the second coil 124, kinetic energy of the electromotor is added to kinetic energy of the second shaft 111.

Meanwhile, if the first rotating plate 110 is directly connected to the second rotating plate 120 by the operation of the electric clutch, the rotational speed of the third rotating plate 130 becomes V1, and the rotational speed of the second shaft 131 also becomes V1.

When it is desired to maintain the rotational speed of the second shaft 131 at V1, because torque generated by the magnetic field and power to be generated are not required any more, the power supply is turned off, but only the electric clutch is used. The reason why the power supply is turned off is to prevent even small power consumption occurring due to the generation of the magnetic field.

Next, an electric continuously variable transmission according to a second embodiment of the present invention will be described herein below.

Figure 4:
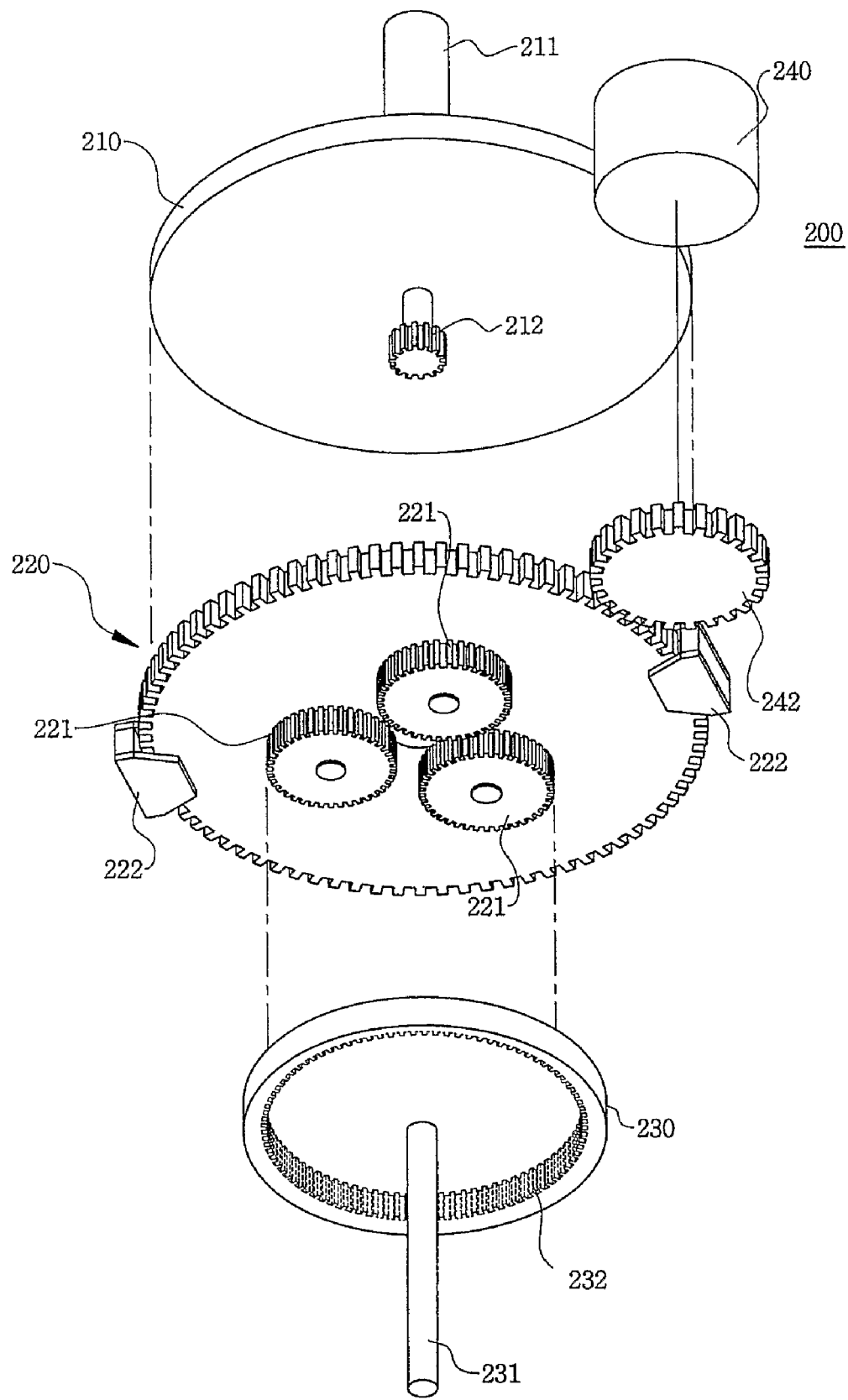
FIG. 4 is an exploded perspective view of an electric continuously variable transmission, according to a second embodiment of the present invention.

FIG. 4 is an exploded perspective view of the electric continuously variable transmission, according to the second embodiment of the present invention.

Referring to FIG. 4, the electric continuously variable transmission 200 according to the second embodiment of the present invention includes a first rotating plate 210, a second rotating plate 220, a third rotating plate 230, an electric clutch (not shown) and an electric brake 222.

The first rotating plate 210 is fastened to a first shaft 211. A sun gear 212 is mounted to the first rotating plate 210. A planetary gear unit 221 is mounted to the second rotating plate 220. A first ring gear 223 is provided around a circumferential outer surface of the second rotating plate 220.

The third rotating plate 230 is fastened to a second shaft 231. A second ring gear 232 is provided on a circumferential inner surface of the third rotating plate 230.

The sun gear 212 rotatably engages with the planetary gear unit 221. The second ring gear 232 also rotatably engages with the planetary gear unit 221.

The electric continuously variable transmission 200 further includes a control gear 242 which engages with the first ring gear 223 and has a central shaft which is coupled to a rotor of a generator 240. An electric load is electrically connected to a coil of the generator 240.

The operation and effect of the electric continuously variable transmission 200 having the above-mentioned construction when a magnetic field is not generated in the rotor are the same as those of the first embodiment.

The operation of the transmission 200 when the magnetic field is generated is as follows. If the size of the magnetic field of the rotor of the generator 240 is increased, or if the resistance value of the electric load is reduced, torque to be applied to the rotor by the magnetic field is increased.

The torque applied to the rotor by the magnetic field is transmitted to the second rotating plate 220 through the control gear 242 and the first ring gear 223. Because the torque is applied in the opposite direction of the rotation of the second rotating plate 220, the torques, applied opposite to the rotating directions of the second rotating plate 220 and the second shaft 231, are increased, and the rotational speeds are reduced, until the torques of the sun gear 212, the planetary gear unit 221 and the ring gear 232 are equilibrated.

Furthermore, because induced current flows through the coil of the generator 240, power is generated. The generated power may be stored in an energy storage device in the same manner as that described for the first embodiment.

When it is desired to stop the second rotating plate 220 and to rotate the second shaft 231 in a reverse direction, the electric brake is used. When the second rotating plate 220 is stopped, because the rotor is also stopped so that power is not generated any more, it is preferable that the magnetic field of the rotor be removed. This is to prevent power consumption from occurring due to generation of magnetic field.

Next, an electric continuously variable transmission according to a third embodiment of the present invention will be described herein below.

Figure 5:
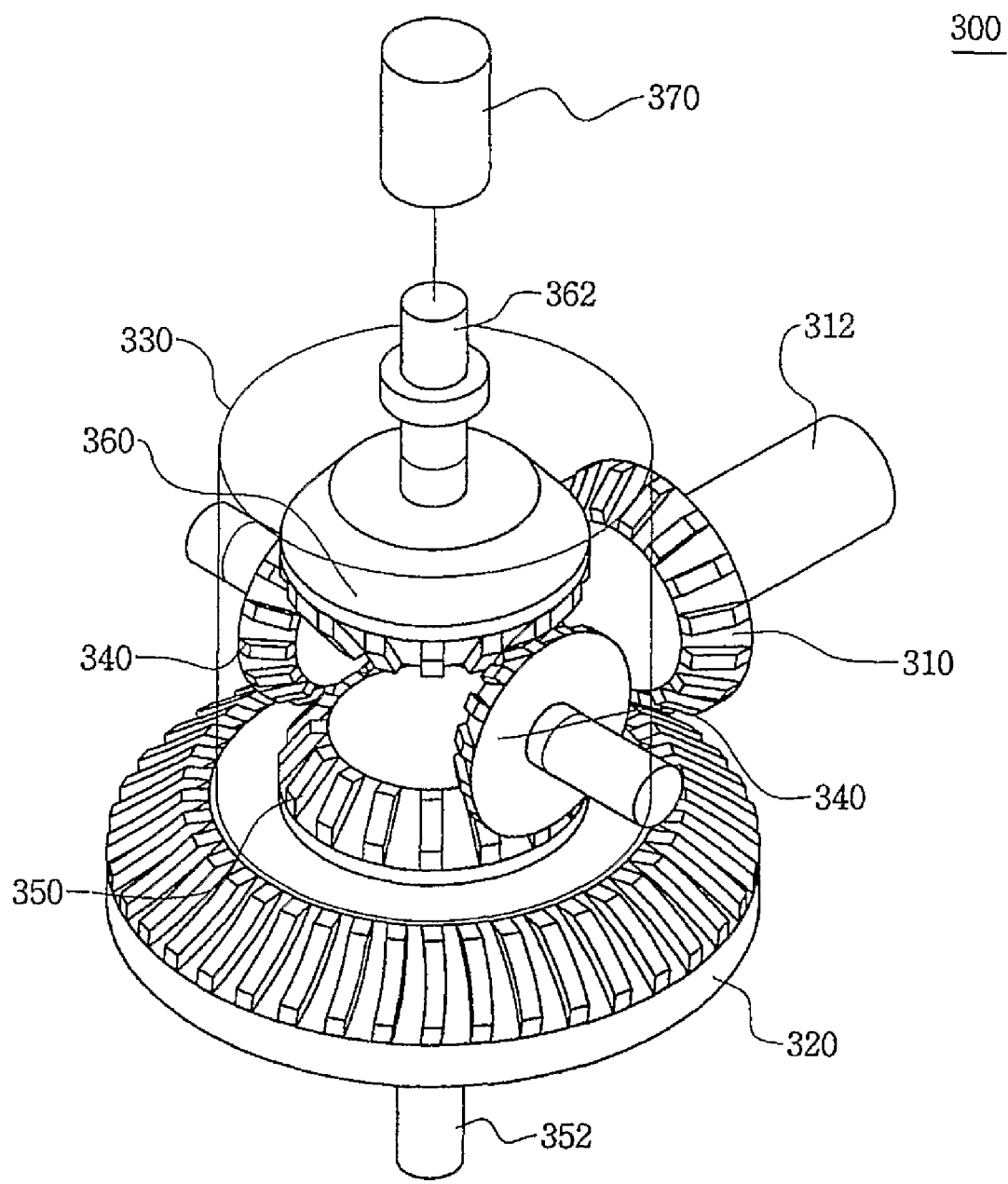
FIG. 5 is an exploded perspective view of an electric continuously variable transmission, according to a third embodiment of the present invention.

FIG. 5 is an exploded perspective view of the electric continuously variable transmission, according to the third embodiment of the present invention.

Referring to FIG. 5, the electric continuously variable transmission 300 according to the third embodiment of the present invention includes a drive pinion 310, an arm 330, differential pinions 340, a first gear 350, a second gear 360 and a generator 370.

The drive pinion 310 is mounted to a drive shaft 312. The ring gear 320 rotatably engages with the drive pinion 312. The arm 330 is fastened to the ring gear 320. The differential pinions 340 are provided in the arm 330.

The first gear 350 and the second gear 360 rotatably engage with the differential pinions 340 and are respectively coupled to first ends of an output shaft 352 and a control shaft 362.

A second end of the control shaft 362 is fastened to the rotor of the motor-operated generator 370. A coil of the motor-operated generator 370 is electrically connected to an electric load (not shown).

The control shaft 362 is provided with an electric brake (not shown).

The operation and effect of the electric continuously variable transmission according to the third embodiment of the present invention will be explained in detail herein below.

In the case in which no magnetic field is generated in the rotor of the generator 370, when the drive shaft 312 is driven by a motor, the output shaft 352 and the control shaft 362 are operated in the same manner as that of typical differential gear devices.

In detail, when a rotational speed of the drive shaft 312 is designated by Va, and a rotational speed of the ring gear 320 is designated by Vb, if the sizes of torques applied to the output shaft 352 and the control shaft 362 are the same, the rotational speeds of the output shaft 352 and the control shaft 362 are the same at Vb.

If the sizes of torques applied to the output shaft 352 and the control shaft 362 differ from each other, the rotational speed of a shaft to which the larger torque is applied is reduced, while the rotational speed of the other shaft is increased. Here, the sum of the rotational speeds of two shafts is constant at 2Vb.

However, if a magnetic field is generated in the rotor of the generator 370, the torque generated by the magnetic field is applied to the rotor in the opposite direction of the rotation of the rotor. Furthermore, the torque is applied to the control shaft 362 in the opposition direction of the rotation thereof, because the control shaft 362 is fastened to the rotor.

Therefore, the rotational speed of the control shaft 362 is reduced, and the rotational speed of the output shaft 352 is increased by the reduced rotational speed of the control shaft 362.

If the size of the magnetic field is increased, or if the resistance value of the electric load is reduced, the torque generated by the magnetic field is further increased, so that the increment of the rotational speed of the output shaft 352 is further increased.

Simultaneously, power is generated in the generator 370. The generated power may be stored in an energy storage device. For example, if an electromotor (not shown), a rotating shaft of which is fastened to the output shaft 352, is used as the electric load, power transmitting efficiency can be increased during a speed changing section.

When it is desired to maintain the rotational speed of the output shaft 352 at 2Vb, the rotation of the control shaft 362 is stopped using the electric brake (not shown). If the control shaft 362 is stopped, because power is not generated any more, it is preferable that the magnetic field of the rotor be removed, thus preventing power consumption from occurring due to the generation of the magnetic field.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

The invention claimed is:

1. An electric continuously variable transmission, comprising: a first rotating plate mounted to a first shaft and provided with a sun gear; a second rotating plate to which a planetary gear unit is mounted; and a third rotating plate mounted to a second shaft, with a ring gear provided on a circumferential inner surface of the third rotating plate, wherein the transmission further comprises:
   a field unit, comprising: a first coil wound around a plurality of cores provided on a surface of the first rotating plate, wherein directions of winding the first coil around adjacent cores alternate, and the first coil is electrically connected to a power supply; and
   a generation coil unit, comprising: a second coil wound around a plurality of cores provided on a surface of the second rotating plate, wherein directions of winding the second coil around adjacent cores alternate, and the second coil is electrically connected to an electric load.

2. The electric continuously variable transmission according to claim 1, wherein the electric load is an electromotor, a rotating shaft of which is coupled to the second shaft.

3. The electric continuously variable transmission according to claim 1 or 2, wherein the second rotating plate is provided with an electric brake.

4. A method of driving the electric continuously variable transmission of claim 1, comprising the steps of:
   (a) driving the first shaft using a motor;
   (b) adjusting a size of a magnetic field generated in the field unit by adjusting power of the power supply, so that both a rotational speed of the second rotating plate and a rotational speed of the second shaft are adjusted by the adjustment of the size of the magnetic field; and (c) fastening the first rotating plate and the second rotating plate to each other, and turning the power supply off.

5. The method of driving the electric continuously variable transmission according to claim 4, further comprising the step of:

(d) rotating the third rotating plate in a direction opposite to rotation of the first rotating plate by stopping the second rotating plate using an electric brake.

6. An electric continuously variable transmission, comprising:

a first rotating plate mounted to a first shaft and provided with a sun gear;

a second rotating plate to which a planetary gear unit is mounted, with a first ring gear provided around a circumferential outer surface of the second rotating plate;

a third rotating plate mounted to a second shaft, with a ring gear provided on a circumferential inner surface of the third rotating plate;

a control gear, a central shaft of which is coupled to a rotor of a generator, the control gear engaging with the first ring gear; and an electric load electrically connected to a coil of the generator.

7. The electric continuously variable transmission according to claim 6, wherein the second rotating plate is provided with an electric brake.

8. A method of driving the electric continuously variable transmission of claim 6, comprising the steps of (a) driving the first shaft using a motor;

(b) adjusting a size of a magnetic field of the rotor, so that both a rotational speed of the second rotating plate and a rotational speed of the second shaft are adjusted;

(c) fastening the first rotating plate and the second rotating plate to each other; and (d) stopping the second rotating plate using an electric brake, and removing the magnetic field of the rotor.

9. An electric continuously variable transmission, comprising:

a drive pinion mounted to a drive shaft;

a ring gear engaging with the drive pinion;

an arm fastened to the ring gear;

a differential pinion provided in the arm;

a first gear engaging with the differential pinion and coupled to an output shaft; and a second gear engaging with the differential pinion and coupled to a first end of a control shaft, wherein a second end of the control shaft is fastened to a rotor of a motor-operated generator, and a coil of the motor-operated generator is electrically connected to an electric load.

10. The electric continuously variable transmission according to claim 9, wherein the electric load is an electromotor, a rotating shaft of which is coupled to the output shaft.

11. The electric continuously variable transmission according to claim 9 or 10, wherein the control shaft is provided with an electric brake.

12. A method of driving the electric continuously variable transmission of claim 9, comprising the steps of:

(a) driving the drive shaft using a motor;

(b) adjusting a size of a magnetic field of the rotor, so that both a rotational speed of the control shaft and a rotational speed of the output shaft are adjusted; and (c) stopping the rotation of the control shaft using an electric brake, and removing the magnetic field of the rotor.

* * * * *